United States Patent [19]

Wright

[11] 4,283,503
[45] Aug. 11, 1981

[54] POLYPHENYLENE OXIDE BLENDING

[75] Inventor: Roy F. Wright, Bartlesville, Okla.

[73] Assignee: Phillips Petroleum Co., Bartlesville, Okla.

[21] Appl. No.: 101,669

[22] Filed: Dec. 10, 1979

[51] Int. Cl.$^3$ ............................................. C08L 71/04
[52] U.S. Cl. ...................................... 525/89; 525/68; 525/132; 525/133; 525/901; 525/905
[58] Field of Search ................ 525/89, 133, 905, 901, 525/68, 132; 260/5; 528/502

[56] References Cited

U.S. PATENT DOCUMENTS

| | | | |
|---|---|---|---|
| 3,383,340 | 5/1968 | MacCallum et al. | 260/3 |
| 3,383,435 | 5/1968 | Cizek | 260/874 |
| 3,458,602 | 7/1969 | Pollock | 260/880 |
| 3,639,508 | 2/1972 | Kambour | 260/876 B |
| 3,660,531 | 5/1972 | Lauchlan et al. | 525/132 |
| 3,920,770 | 11/1975 | Nakashio et al. | 260/897 R |
| 4,113,800 | 9/1978 | Lee, Jr. | 260/876 B |

FOREIGN PATENT DOCUMENTS 914816  11/1972  Canada .................................... 525/905

*Primary Examiner*—Theodore E. Pertilla

[57] ABSTRACT

Polyphenylene oxide is blended with conjugated diene polymer by first producing a polymer mixture of polyphenylene oxide and conjugated diene polymer by solution blending and then mechanically blending the so produced masterbatch with the conjugated diene polymer.

5 Claims, No Drawings

POLYPHENYLENE OXIDE BLENDING

This invention relates to the blending of polyphenylene oxide and conjugated diene polymers. In another aspect this invention relates to a new polyphenylene oxide conjugated diene polymer blend composition.

BACKGROUND OF THE INVENTION

The polyphenylene oxide resins are a family of engineering thermoplastics that are well known to the polymer art. The polyphenylene oxides may be made by a variety of catalytic and non-catalytic processes from the corresponding phenols or reactive derivatives thereof. By way of illustration, certain of the polyphenylene oxides are disclosed in U.S. Pat. Nos. 3,306,874; 3,306,875; 3,257,357; and 3,257,358. In accordance with the prior art the polyphenylene oxides can be prepared by an oxidative coupling reaction comprising passing an oxygen-containing gas through a reaction solution of a phenol and a metal-amine complex catalyst. U.S. Pat. No. 3,356,761 discloses polyphenylene oxide resins prepared by dissolving a polyphenylene oxide in styrene monomer and the styrene monomer subsequently polymerized into polystyrene to produce a mixture of polyphenylene oxide and polystyrene, i.e. a polyphenylene oxide resin. U.S. Pat. Nos. 3,373,226 and 3,383,435 disclose mixtures of polyphenylene oxide and a styrene resin.

Blending of polyphenylene oxide, or polyphenylene oxide resins, and conjugated dienemonovinylarene block copolymers has been observed previously to lead to compositions having useful properties. For example, the impact strength of polyphenylene oxide resin can be significantly increased by the addition of a minor amount of a conjugated diene-monovinylarene teleblock copolymer, whereas the addition of a minor amount of a polyphenylene oxide resin to a conjugated diene-monovinylarene copolymer results in improved high temperature properties as well as improved tear and abrasion resistance.

Mechanical blending of a polyphenylene oxide and conjugated diene-homopolymers or copolymers results in blends having less than optimum physical properties. This is due to the requirement that mechanical blending to give a homogeneous blend must be conducted at temperatures above the glass transition temperature of the polyphenylene oxide (ca. 220° C.), which is too high for processing unsaturated conjugated diene-homopolymers or copolymers without serious degradation.

Solution blending of polyphenylene oxide and conjugated diene homopolymers or copolymers requires use of a solvent system which typically contains at least 10 weight percent, preferably greater than 20 weight percent, aromatic hydrocarbon solvent due to the low solubility of polyphenylene oxide in paraffinic or cycloparaffinic solvents. Although solution blending with a partially or totally aromatic solvent system does give a blended composition having good physical properties, solution blending of large samples of polymers is time consuming and expensive in view of the large quantities of solvent required and the current high prices of hydrocarbons, especially aromatic hydrocarbons.

STATEMENT OF THE INVENTION

It is one object of this invention to provide a new process for blending polyphenylene oxide and conjugated diene polymers.

A further object of this invention is to provide a new polyphenylene oxide/conjugated diene polymer blend composition which is useful as a polymer additive.

Still another object of this invention is to provide a process for incorporating polyphenylene oxide into a conjugated diene polymer without temperature caused degradation of the conjugated diene polymer.

As used here, the term "conjugated diene polymer" is intended to refer to homopolymers and copolymers of conjugated dienes, particularly including conjugated diene-monovinylarene block copolymers.

In accordance with this invention a process for blending polyphenylene oxide and conjugated diene polymer is provided which comprises producing a masterbatch of a blend of polyphenylene oxide and conjugated diene polymer by solution blending and thereafter mechanically blending this masterbatch with a second conjugated diene polymer which can be the same as or different from the conjugated diene polymer used for the production of the masterbatch. Optional ingredients that can be incorporated into the mixture and are preferably incorporated into the masterbatch are styrene resins, extender oils, and conventionally employed polymer additives.

More specifically, this invention provides a process for blending polyphenylene oxide and conjugated diene polymer comprising the following steps:

Polyphenylene oxide and a first conjugated diene polymer are solution blended to form a solution of these polymers in a solvent. Then a blended initial mixture of polyphenylene oxide and said first conjugated diene polymer is recovered from this solution, the initial mixture being essentially free of this solvent. Finally, the initial mixture or at least a portion thereof is mechanically blended (let down) with a second conjugated diene polymer to obtain the final mixture of polyphenylene oxide in the conjugated diene polymer. The second conjugated diene polymer can be the same as or different from the first conjugated diene polymer.

The polymeric blend composition prepared by this solution masterbatch and mechanical blending let down process has physical properties which are superior to those of a similar blend prepared by mechanical blending only. Furthermore, the solution masterbatch-mechanical blending let down process compared to an all solution blending process, is less expensive, less time consuming, and provides considerable versatility in that a series of polymeric blend compositions having different polyphenylene oxide:conjugated diene monovinylarene copolymer weight ratios can be prepared from a given masterbatch by adding various levels of conjugated diene monovinylarene copolymer during the mechanical blending let down step.

In accordance with a second embodiment of this invention a composition of matter is provided which comprises an intimate admixture of 65 to 130 parts by weight of polyphenylene oxide and 100 parts by weight of an elastomeric, rubbery nonresinous conjugated diene polymer. This composition of matter, which can also be characterized as comprising roughly equal quantities by weight of polyphenylene oxide and elastomeric, rubbery conjugated diene polymer, is useful as an additive that can be mechanically blended with conjugated diene polymers in such quantities as desired for obtaining certain quantities in such polymers that are attributable to the desired concentration of polyphenylene oxide in such rubbery polymer blends. The term "rubbery" as used above refers to a material that is capable of recovery from large deformations quickly and forcibly and retracts within one minute to less than 1.5 times its original length after being stretched at room temperature (20°–27° C.) to twice its length and held for one minute before release (ASTM D 1566-76). Further details and specifically preferred additional embodiments of this composition will become apparent from the following description and the claims.

The composition and process of this invention constitute a significant improvement in the art of blending polyphenylene oxide into conjugated diene polymers, particularly into rubbery conjugated diene polymers. The quantity of polyphenylene oxide mixed with the conjugated diene polymer can be readily controlled. A homogeneous distribution of polyphenylene oxide in the final polymer is achieved without the application of overly high temperatures and the preparation of the masterbatch of a polyphenylene oxide/conjugated diene polymer mixture by solution blending is not an economically prohibitive step.

POLYPHENYLENE OXIDES AND POLYPHENYLENE OXIDE RESINS

The polyphenylene oxides have the repeating structural unit of the general formula:

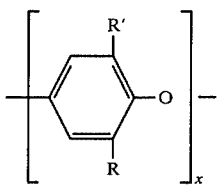

wherein the oxygen atom of one repeating unit is connected to the phenylene nucleus of the next repeating unit, R is a monovalent substituent selected from the group consisting of hydrogen, hydrocarbon radicals free of a tertiary α-carbon atom, halohydrocarbon radicals having at least two carbon atoms between the halogen atom and phenyl nucleus and being free of a tertiary α-carbon atom, hydrocarbonoxy radicals free of aliphatic, tertiary α-carbon atoms, and halohydrocarbonoxy radicals having at least two carbon atoms between the halogen atom and phenyl nucleus and being free of an aliphatic, tertiary α-carbon atom; R' is the same as R and may additionally be a halogen; and x may represent any whole integer greater than 100.

Examples of polyphenylene oxides corresponding to the above formula can be found in the above-referenced patents of Hay and Stamatoff. Especially preferred is poly(2,6-dimethyl-1,4-phenylene oxide).

The polyphenylene oxides may be prepared in various ways. One method comprises oxidizing a phenol represented by the formula:

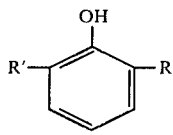

where R and R' have the same meanings given above. These phenols are oxidized by passing an oxygen-containing gas through the particular phenol in the presence of a catalyst system comprising a cuprous salt and a tertiary amine.

The polyphenylene oxide, which is used for blending with the conjugated diene-monovinylarene copolymer, preferably is the pure polymer, or alternatively, it may be a styrene resin modified-polyphenylene oxide, i.e. a blend of a polyphenylene oxide and a styrene resin.

The styrene resin is a resinous polymer having at least 25 weight percent of the polymer units derived from the compound having the formula:

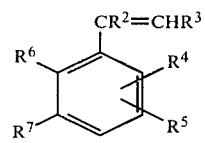

wherein $R^2$ and $R^3$ are selected from the group consisting of hydrogen and lower alkyl or alkenyl groups of from 1 to 6 carbon atoms; $R^4$ and $R^5$ are selected from the group consisting of chloro, bromo, hydrogen, and lower alkyl groups of from 1 to 6 carbon atoms; and $R^6$ and $R^7$ are selected from the group consisting of hydrogen and lower alkyl and alkenyl groups of from 1 to 6 carbon atoms or $R^6$ and $R^7$ may be concatenated together with hydrocarbyl groups to form a naphthyl group.

The term "styrene resin" as used herein includes by way of example, homopolymers such as polystyrene, poly(α-methylstyrene), and poly(chlorostyrene), the modified polystyrenes such as rubber modified polystyrenes, and styrene-containing copolymers such as styrene-chlorostyrene copolymers, styrene-bromostyrene, copolymers, styrene-acrylonitrile copolymers, styrene-butadiene copolymers, styrene-acrylonitrile-α-alkylstyrene copolymers, styrene-acrylonitrile-butadiene copolymers, and styrene-maleic anhydride copolymers. In addition, other suitable polymers include graft copolymers of styrene or α-methylstyrene polymerized on a polybutadiene or a butadiene-styrene copolymer, and graft copolymers of styrene or α-methylstyrene with vinyl monomers polymerized on a polybutadiene or a butadiene-styrene copolymer. The styrene resins described above may be prepared using polymerization methods described in such as Billmeyer's Textbook of Polymer Science, New York, Interscience Publishers, 1966.

The method of blending the polyphenylene oxide with the styrene resin, when a styrene resin modified-polyphenylene oxide is to be used in the process of this invention, is not critical and does not constitute a part of this invention. The commercially used method comprises blending the polyphenylene oxide and the styrene resin in powder or granular form, extruding the blend, chopping into pellets and reextruding. Another possibility in accordance with this invention would involve the solution blending of polyphenylene oxide, styrene resin and conjugated diene polymer to produce the masterbatch polymer mixture; thereby the additional step of blending polyphenylene oxide and, e.g. polystyrene is avoided.

The polyphenylene oxides and the styrene resins are combinable with each other in all proportions. Consequently, compositions comprising from 30 to 100 weight percent polyphenylene oxide and from 70 to 0 weight percent styrene resin are included within the scope of the invention. In general, compositions containing from 40 to 85 percent polyphenylene oxide and from 60 to 15 percent styrene resin exhibit the best overall combination of properties and these compositions are preferred.

Suitable commercially available polystyrene-modified polyphenylene oxides are sold by General Electric under the trademark "Noryl."

Conjugated Diene Polymers

Both for the preparation of the masterbatch and for the final mixing step in the process of this invention homopolymers or copolymers of conjugated diene are useful. Thus, poly(1,3-butadiene) as well as copolymers of 1,3-butadiene and styrene are useful. These polymers are rubbery, elastomeric polymers as defined above and not resins.

Preferably conjugated diene-monovinylarene copolymers are used in the process of this invention. In general, any copolymer containing one or more blocks of polymerized monovinylarene is suitable for use in the process of this invention. Therefore, any monomer containing an active vinylidene group ($CH_2=C<$), a conjugated dienyl group, or having a cyclic ester structure (lactone), and which is copolymerizable with a monovinylarene monomer can be used for preparing the polymers to be solution masterbatched with the polyphenylene oxide or polyphenylene oxide resins according to the process of this invention.

Presently preferred are the conjugated dienemonovinylarene teleblock copolymers represented by the general formula I or II,

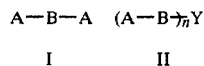

wherein A represents a block of polymerized monovinylarene monomer, B represents a block of polymerized conjugated diene units or alternately a random or random tapered block copolymer of conjugated diene and monovinylarene monomers, Y is the residual unit from a multifunctional coupling agent or a multifunctional initiating species and n has a value from 2 to 6.

Conjugated dienes useful in the preparation of homopolymers and the linear and branched teleblock copolymers of this invention are generally those containing 4 to 12 carbon atoms per molecule, preferably those containing 4 to 8 carbon atoms per molecule. Specific examples of useful conjugated dienes include 1,3-butadiene, isoprene, 2,3-dimethyl-1,3-butadiene, piperylene, 3-butyl-1,3-octadiene, and 2-phenyl-1,3-butadiene, and mixtures thereof. Especially preferred is 1,3-butadiene due to its availability and favorable cost.

The monovinylarene monomers which are employed with the above described conjugated dienes in forming the linear and branched teleblock copolymers include those containing from about 8 to 20 carbon atoms per molecule. Examples of specific monovinylarene monomers include styrene, α-methylstyrene, p-vinyltoluene, and p-t-butylstyrene, and mixtures thereof. Presently preferred is styrene due to its availability.

Linear and branched teleblock copolymers of this invention can be prepared by techniques well known in the art. Such techniques are disclosed in U.S. Pat. Nos. 3,251,905, 3,281,383, 3,639,521, and 3,639,517. Typical of such techniques are the sequential polymerization of monomer increments initiated by organomonolithium compounds followed by optional coupling with polyfunctional coupling agents, and the sequential polymerization of monomer increments initiated by organomultilithium compounds.

The teleblock copolymers presently preferred for the invention generally contain from 15 to 90 weight percent polymerized conjugated diene units with the balance being polymerized monovinylarene units. Number average molecular weights of the useful copolymers are generally in the range of about 25,000 to 1,000,000, preferably in the range of about 100,000 to 400,000.

The rubbery conjugated diene polymers which are preferred in accordance with this invention, frequently are used in the form of oil extended rubbers. Based on 100 parts by weight of the conjugated diene polymers 5 to 1000, typically 25 to 400, parts by weight of extender oil may be present. It is preferred to use 15 to 150 parts by weight of extender oil. This extender oil is preferably a naphthenic extender oil and may be present in both the masterbatch and the second diene polymer or in only one of the conjugated diene polymers.

The hydrogenated analogues of these polymers are also suitable for this invention.

MASTERBATCH COMPOSITION AND PREPARATION

The weight ratio of polyphenylene oxide:conjugated diene polymer to be used in preparing the solution blended masterbatch can range broadly from 90:10 to 1:99, preferably from 50:50 to 10:90. The weight ratio chosen will depend at least partially on the final polymeric blend composition(s) that are to be prepared from the masterbatch by the final mechanical let down step.

The weight ratio of total solvent:total polymer for preparing the masterbatch generally should be greater than 3:1 to insure polymer solubility. Solvent systems will be described below.

The generally employed and the preferred compositions of the masterbatch as well as the final mixture are shown in the following tabulation.

| Masterbatch Composition | | |
|---|---|---|
| | (Parts by Weight) | |
| | Generally | Preferred |
| Polyphenylene oxide | 1 to 900 | 11 to 100 |
| Conjugated diene polymer | 100 | 100 |
| Styrene resin | 0 to 2100 | 0 to 150 |
| Extender oil | 0 to 1000 | 15 to 150 |

Other materials optionally can be solution blended with the two polymers in the masterbatch preparation step. These other materials preferably should be soluble in the blending solvent, and can include such as extender oils, antioxidants, UV stabilizers, plasticizers, processing aids, other polymers, and the like, and mixtures thereof.

Solvent systems suitable for use in solution blending of the masterbatch typically contain at least 10 weight percent, preferably at least 20 weight percent, aromatic hydrocarbon solvent so as to prevent precipitation of the polyphenylene oxide during blending and prior to isolation of the polymeric masterbatch (polyphenylene oxides have limited solubility in paraffinic and cycloparaffinic solvents). An all aromatic hydrocarbon system, i.e. one or more aromatic hydrocarbon solvents, is especially suitable since polyphenylene oxides and conjugated diene-monovinylarene copolymers typically are readily soluble in aromatic solvents. Alternatively and preferably for the sake of convenience in some instances, the conjugated diene-monovinylarene copolymer can be dissolved in one or more paraffinic or cycloparaffinic hydrocarbon solvents, and the polyphenylene oxide or polyphenylene oxide resin dissolved in an aromatic hydrocarbon solvent, and the two solutions then mixed together. This is especially practical when a conjugated diene-monovinylarene polymer cement is available for blending with an aromatic hydrocarbon solution of a polyphenylene oxide. A premixed mixture of aromatic hydrocarbon and paraffinic or cycloparaffinic hydrocarbon solvents can also be used to dissolve the polymers for the solution blending masterbatch preparation step.

The aromatic hydrocarbon solvents suitable for solution blending of the masterbatch include aromatic hydrocarbon solvents which may or may not be ring-substituted with one or more paraffinic and cycloparaffinic side chains, wherein the total number of carbon atoms in all the substituents attached to the aromatic nucleus is about six or less. The total number of carbon atoms in the aromatic solvent is generally 6 to 14. Examples of such solvents include benzene, toluene, cumene, the xylenes, the diethylbenzenes, mesitylene, p-cymene, and cyclohexylbenzene, alone or in admixture.

The solution blending step is conducted in any container or apparatus which insures intimate mixing and which results in the formation of a homogeneous blend of polymers and other optional materials. Nonlimiting examples of suitable containers and apparatus for solution blending of the masterbatch include mechanically stirred reaction vessels and sealed beverage bottles which are mechanically tumbled.

The solution blending step can be conducted at temperatures and pressures sufficient to maintain the polymers in solution. Typically the temperature is maintained within the range of about 25° C. up to the boiling point of the lowest boiling solvent being used. Typically the blending temperature will thus be in the range of 25° C. to 175° C. The duration of the solution blending step is for that period of time which will result in the formation of a homogeneous solution of the polymers being blended in the solvent mixture. Following formation of the homogeneous masterbatch solution of the blended polymers, the masterbatch blend is isolated from the solvent mixture by typical recovery methods such as steam stripping, followed by separation of the precipitated or solid polymeric masterbatch blend by filtration, decantation, or other suitable means.

MECHANICAL LET DOWN

The final step in the blending process of this invention consists of mechanically mixing the previously described masterbatch with additional polymers and other compounding ingredients to obtain the final desired composition. Typically during this step additional conjugated diene polymer is added, preferably along with such ingredients as extender oils, antioxidants, UV stabilizers, processing aids, fillers, vulcanization ingredients, plasticizers, other polymers, and the like, and mixtures thereof, as desired or needed. The mechanical let down step can be conducted using any suitable mixing device conveniently and conventionally used for mixing rubbers or plastics, such as a differential roll mill, a Banbury mixer, an extruder, or a Brabender Plasti-Corder. In order to facilitate thorough mixing of the polymers and optional ingredients, and to develop the optimum physical properties, the mechanical let down step is carried out at sufficiently high temperatures to soften the polymers so that they are thoroughly dispersed and intermingled with each other. The mechanical mixing temperature will, in general, vary with the particular polymers employed; usually the polyphenylene oxide, which is the higher softening material, will govern the mixing temperature selected. For best results the mechanical blending temperature will be 140° to 200° C. Mixing is continued until a uniform blend is obtained.

The weight ratio of polyphenylene oxide:conjugated diene-monovinylarene copolymer in the final composition can range from 90:10 to 1:99, preferably 40:60 to 5:95, more preferably 25:75 to 15:85.

EXAMPLE I

This example illustrates the usefulness of the masterbatch let down process for preparing polyphenylene oxide/butadiene-styrene radial teleblock copolymer blends, and the superior physical properties of blends prepared by this method compared to the properties of mechanically prepared blends.

A polymeric masterbatch was prepared by dissolving one hundred parts by weight of 70/30 butadiene/styrene radial teleblock copolymer (added as Solprene® 411, manufactured and sold by Phillips Petroleum Company), 75 parts by weight of poly(2,6-dimethyl-1,4-phenylene oxide), 50 parts by weight of Flexon 766 naphthenic extender oil, 0.3 parts by weight Irganox 1076 (n-octadecyl [3-(3,5-di-t-butyl-4-hydroxyphenyl)]-propionate; Ciba-Geigy Corp.) and 0.5 parts by weight trisnonylphenyl phosphite in 2025 parts by weight toluene in a stirred vessel at 93° C. for one hour. The polymeric blend masterbatch was isolated by steam stripping and then tray dried to less than 0.75 weight percent volatiles at about 70° C. for about 8 hours. One hundred parts by weight of the dried masterbatch was mechanically blended with 275 parts by weight of additional 70/30 butadiene/styrene radial teleblock copolymer (Solprene® 411) and 175 parts by weight of additional Flexon 766 naphthenic extender oil in a Midget Banbury mixer. The mixer was operated at 140 rpm with water at 70° C. continuously being circulated through the jacket of the mixer. The masterbatch, the additional butadiene/styrene copolymer, and one half of the additional extender oil was initially charged to the mixer. When the stock temperature reached 140° C., the remainder of the additional extender oil was added. After a total mixing time of six minutes, the oil-extended polymeric blend composition was dumped at a stock temperature of 165° C., and then further mixed on a 6"×12" roll mill at 125° C. before sheeting off. Test specimens for physical property evaluation were cut from 0.080 inch thick (0.203 cm) slabs which were compression molded at 175° C.

A second 100 parts by weight portion of the dried masterbatch was mechanically blended with 412.5 parts by weight of an oil-extended 70/30 butadiene radial teleblock copolymer which contained 50 parts by weight Flexon 766 naphthenic extender oil per 100 parts by weight of the butadiene/styrene copolymer (added as Solprene® 480, manufactured and sold by Phillips Petroleum Co.) to give a blend having the identical composition as that of the first masterbatch let down composition described above. The mechanical blending step and test specimen preparation were conducted using the same equipment and using the same basic procedure described above.

As a control sample, a mechanically blended composition comprising 100 parts by weight of 70/30 butadiene/styrene radial teleblock copolymer, 20 parts by weight poly(2,6-dimethyl-1,4-phenylene oxide), and 60 parts by weight Flexon 766 naphthenic extender oil was mixed and test specimens prepared using the same conditions described above for the mechanical let down of the solution masterbatch, with the one exception that all of the extender oil was charged initially to the Banbury mixer along with all of the two polymers.

As a second control, a solution blended composition comprising the same amounts and types of polymers and extender oil used for preparing the mechanically blended composition was prepared using toluene as the solvent. The procedure and conditions for preparing this solution blended composition was the same as used for preparing the solution blended masterbatch as described earlier. Test specimens were prepared as described for the masterbatch let down and mechanically blended compositions.

Physical properties of these polymeric blends prepared by mechanical, solution, and masterbatch let down procedures are shown in Table I.

TABLE I

Physical Properties of Masterbatch Let Down, Solution Blended, and Mechanically Blended Poly(2,6-dimethyl-1,4-phenylene Oxide)/Styrene Radial Teleblock Copolymer$^a$ Compositions$^b$

| Run | Blending Method | Melt Flow$^c$ | Distortion (100° C.), %$^d$ | 300% Modulus, MPa$^e$ | Tensile, MPa$^e$ | | | Hardness, Shore A (25° C.)$^f$ |
|---|---|---|---|---|---|---|---|---|
| | | | | | 25° C. | 60° C. | 80° C. | |
| 1 | Mechanical$^g$ | 82 | 67 | 1.6 | 3.9 | 1.2 | 0.5 | 45 |
| 2 | Solution$^h$ | 2.8 | 0 | 3.2 | 8.6 | 6.9 | 4.1 | 68 |
| 3 | Masterbatch let down$^i$ | 20 | 1.6 | 2.8 | 11.3 | 5.4 | 2.8 | 60 |
| 4 | Masterbatch let down$^j$ | 26 | 6.7 | 2.9 | 9.5 | 4.8 | 2.4 | 56 |

$^a$Added as Solprene® 411, a 70/30 butadiene/styrene radial teleblock copolymer having $M_w/M_n$ of about 300,000/220,000, or as Solprene® 480 (see footnote $^j$).
$^b$All compositions consist of 100 parts by weight of the butadiene/styrene copolymer, 20 parts by weight of the polyphenylene oxide, and 60 parts by weight of the naphthenic extender oil Flexon 766.
$^c$ASTM D1238-73; condition F.
$^d$ASTM D2633-76.
$^e$ASTM D412-75.
$^f$ASTM D2240-75.
$^g$The composition of footnote $^b$ mixed in a Midget Banbury mixer for six minutes and dumped at 165° C. Rubber added as Solprene® 411.
$^h$The composition of footnote $^b$ solution blended in toluene and recovered by steam stripping. Rubber added as Solprene® 411.
$^i$Solution blended (toluene) masterbatch of 100 parts by weight 70/30 butadiene/styrene radial teleblock copolymer, 75 parts by weight poly(2,6-dimethyl-1,4-phenylene oxide), and 50 parts by weight Flexon 766 naphthenic extender oil was mechanically blended with 275 parts by weight of additional 70/30 butadiene/styrene radial teleblock copolymer and 175 parts by weight additional naphthenic oil in a Midget Banbury mixer for six minutes and dumped at 165° C. to give the composition of footnote $^b$. Rubber added as Solprene® 411.
$^j$The same solution blended masterbatch of footnote $^i$ was mechanically blended with 412.5 parts by weight of Solprene® 480 (an oil-extended 70/30 butadiene/styrene radial teleblock copolymer having $M_w/M_n$ of about 300,000/220,000 and containing 50 parts of naphthenic oil per 100 parts of butadiene/styrene copolymer) and 37.5 parts by weight of additional naphthenic oil in a Midget Banbury for 6 minutes and dumped at 165° C. to give the composition of footnote $^b$.

These data illustrate that the poly(2,6-dimethyl-1,4-phenylene oxide)/butadiene-styrene radial teleblock copolymer blends prepared by the masterbatch let down process of this invention (Runs 3 and 4) have physical properties superior to those obtained by one step mechanically blending of the entire composition (Run 1), and furthermore the polymeric blends prepared by the process of this invention have properties that are in the range of the properties of a blend prepared by a one step solution blending process (Run 2), which requires considerably more solvent, which must be recovered and purified, than the masterbatch let down process of this invention.

Reasonable variations and modifications which will become apparent to those skilled in the art can be made in this invention without departing from the spirit and scope thereof.

I claim:

1. A process for blending polyphenylene oxide and a conjugated diene polymer comprising mechanically blending two-components (a) and (b) namely
   (a) a dry initial mixture of polyphenylene oxide and a first conjugated diene polymer, which mixture has been obtained by solution blending polyphenylene oxide and said first conjugated diene polymer, and
   (b) a second conjugated diene polymer
   to form a final mixture of polyphenylene oxide and conjugated diene polymer, wherein said first and said second conjugated diene polymers can be the same or different.

2. A process in accordance with claim 1 comprising
   (a) solution blending polyphenylene oxide and a first conjugated diene polymer to obtain a solution of polyphenylene oxide and said first conjugated diene polymer in a solvent,
   (b) recovering a solution blended initial mixture of polyphenylene oxide and said first conjugated diene polymer by separating said initial mixture and said solvent,
   (c) mechanically blending at least a portion of said initial mixture with said second conjugated diene polymer to obtain a final mixture of polyphenylene oxide and conjugated diene polymer.

3. A process in accordance with claim 1 wherein said conjugated diene polymers are 1,3-butadiene-styrene block copolymers and wherein said polyphenylene oxide is poly(2,6-dimethyl-1,4-phenylene oxide).

4. A process in accordance with claim 3 wherein said initial mixture further comprises an extender oil.

5. A process in accordance with claim 1 wherein said initial mixture further comprises a styrene resin having at least 25 weight percent of the resin units derived from the compound having the formula:

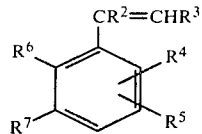

wherein $R^2$ and $R^3$ are selected from the group consisting of hydrogen and lower alkyl or alkenyl groups of from 1 to 6 carbon atoms; $R^4$ and $R^5$ are selected from the group consisting of chloro, bromo, hydrogen, and lower alkyl groups of from 1 to 6 carbon atoms; and $R^6$ and $R^7$ are selected from the group consisting of hydrogen and lower alkyl and alkenyl groups of from 1 to 6 carbon atoms or $R^6$ and $R^7$ may be concatenated together with hydrocarbyl groups to form a naphthyl group.

* * * * *